(12) United States Patent
Matsumoto

(10) Patent No.: US 7,864,105 B2
(45) Date of Patent: Jan. 4, 2011

(54) DISTANCE MEASURING APPARATUS AND DISTANCE MEASURING METHOD

(75) Inventor: Koichi Matsumoto, Tokyo (JP)

(73) Assignee: Nireco Corporation, Tokyo (JP)

( * ) Notice: Subject to any disclaimer, the term of this patent is extended or adjusted under 35 U.S.C. 154(b) by 0 days.

(21) Appl. No.: 12/754,999

(22) Filed: Apr. 6, 2010

(65) Prior Publication Data

US 2010/0245156 A1 Sep. 30, 2010

Related U.S. Application Data

(63) Continuation of application No. PCT/JP2007/074010, filed on Dec. 13, 2007.

(30) Foreign Application Priority Data

Oct. 19, 2007 (JP) .............................. 2007-272373

(51) Int. Cl.
*G01S 13/08* (2006.01)
*G01S 13/00* (2006.01)
*H04B 1/00* (2006.01)

(52) U.S. Cl. .................. 342/127; 342/118; 342/128; 342/194; 375/130

(58) Field of Classification Search ......... 342/118–146, 342/194; 324/326; 375/130–377; 702/158
See application file for complete search history.

(56) References Cited

U.S. PATENT DOCUMENTS

| | | | |
|---|---|---|---|
| 4,044,356 A * | 8/1977 | Fournier ..................... | 342/189 |
| 4,370,653 A * | 1/1983 | Crowley ...................... | 342/42 |
| 4,768,877 A * | 9/1988 | Torregrosa et al. ......... | 356/5.15 |
| 4,933,916 A * | 6/1990 | May et al. .................... | 367/125 |
| 5,075,863 A * | 12/1991 | Nagamune et al. .......... | 702/159 |
| 5,233,352 A * | 8/1993 | Cournane ................... | 342/124 |
| 5,347,283 A * | 9/1994 | Krizek et al. ................ | 342/201 |
| 5,596,330 A * | 1/1997 | Yokev et al. ................ | 342/387 |
| RE35,607 E * | 9/1997 | Nagamune et al. .......... | 702/158 |
| 5,719,579 A * | 2/1998 | Torre et al. .................... | 342/13 |
| 6,218,982 B1* | 4/2001 | Shirai et al. ................. | 342/118 |

(Continued)

FOREIGN PATENT DOCUMENTS

JP 61-145472 7/1986

(Continued)

OTHER PUBLICATIONS

Summarized Translation of the First JP Office Action, Japanese Office Action, JP Application No. 2007-272373, dated Aug. 18, 2010, a total of 5 pages.

*Primary Examiner*—Thomas H Tarcza
*Assistant Examiner*—Peter M Bythrow
(74) *Attorney, Agent, or Firm*—Squire, Sanders & Dempsey L.L.P.

(57) ABSTRACT

Distance measuring apparatus has a rough distance measuring circuit (18) using a time delay circuit and a precise distance measuring circuit (31) for measuring the orientation of the vector of a carrier wave to determine the distance, the sum of which is the final output. The rough distance measuring apparatus (18) has a long measurement span but low precision. The precise distance measuring apparatus (31) has a short measurement span but high precision. The combination provides distance measuring apparatus having a long measurement span and high resolution and capable of implementing precise measurement.

7 Claims, 3 Drawing Sheets

U.S. PATENT DOCUMENTS

| | | | | |
|---|---|---|---|---|
| 6,236,352 B1 * | 5/2001 | Walmsley | ............... | 342/118 |
| 6,476,756 B2 * | 11/2002 | Landt | ............... | 342/42 |
| 6,657,704 B2 * | 12/2003 | Shirai et al. | ............... | 356/4.01 |
| 6,693,582 B2 * | 2/2004 | Steinlechner et al. | ............... | 342/70 |
| 6,714,286 B1 * | 3/2004 | Wheel | ............... | 356/5.05 |
| 6,822,605 B2 * | 11/2004 | Brosche | ............... | 342/130 |
| 6,831,603 B2 * | 12/2004 | Menache | ............... | 342/463 |
| 6,856,279 B2 * | 2/2005 | Hager et al. | ............... | 342/147 |
| 6,856,281 B2 * | 2/2005 | Billington et al. | ............... | 342/174 |
| 7,009,552 B2 | 3/2006 | Sako | | |
| 7,023,377 B2 * | 4/2006 | Axelsson | ............... | 342/109 |
| 7,460,055 B2 * | 12/2008 | Nishijima et al. | ............... | 342/70 |
| 7,564,400 B2 * | 7/2009 | Fukuda | ............... | 342/145 |
| 7,609,199 B2 * | 10/2009 | Nishijima et al. | ............... | 342/175 |
| 7,642,952 B2 * | 1/2010 | Fukuda | ............... | 342/175 |

FOREIGN PATENT DOCUMENTS

| | | |
|---|---|---|
| JP | 02-098685 | 4/1990 |
| JP | 06-16080 | 3/1994 |
| JP | 11-052049 | 2/1999 |
| JP | 11-052050 | 2/1999 |
| JP | 2002-055158 | 2/2002 |
| JP | 2004-125733 | 4/2004 |
| JP | 2005-017193 | 1/2005 |
| JP | 2006-177985 | 7/2006 |

* cited by examiner

DISTANCE MEASURING APPARATUS AND DISTANCE MEASURING METHOD

TECHNICAL FIELD

The present invention relates to a distance measuring apparatus and a distance measuring method which can precisely determine a distance to a target.

BACKGROUND ART

As a technique of precisely measuring a distance to a target, there is a technique described in Japanese Patent Publication of Examined Application (Kokoku) No. 6-16080.
Patent Document 1: JP 6-16080B

DISCLOSURE OF THE INVENTION

However, there is a limit to a resolution of the distance measuring apparatus described in Patent Document 1. The reason is that the resolution is determined by:
(1) the clock frequency of a pseudo random signal;
(2) a difference $\Delta f$ between clock frequencies used for driving two pseudo random signal generators; and
(3) the frequency of a counter for measuring a time from a reference signal to a detection signal.

Concerning items (1) and (2), an increase in the clock frequency of the pseudo random signal will improve the resolution, and a decrease in $\Delta f$ will improve the resolution. However, the increase in the clock frequency of the pseudo random signal and the decrease in $\Delta f$ are limited.

Concerning item (3), it is found from experimental results that due to an influence of distortion of the correlation waveform, further improvement of the resolution cannot be realized when the counter frequency actually exceeds 2 MHz. In other words, although the correlation waveform should ideally be a triangular wave, the waveform is not acute at its peak actually and is distorted. This is caused by the following reasons.
(a) The waveform becomes obtuse due to the low-pass filter performing bandwidth limitation and the peak of the correlation waveform does not become acute.
(b) The frequency is dispersed in a wide bandwidth due to spectrum diffusion. Therefore, the waveform is affected by frequency characteristics and group delay frequency characteristics of components used and thus distortion is generated.

In order to prevent the correlation waveform from being obtuse, the cutoff frequency of the low-pass filter should be increased to the extent that the waveform will not be obtuse. However, this makes the removal of noise superimposed on the signal difficult, leading to deterioration of the S/N ratio. In addition, it is very difficult to manufacture a high-frequency component which has a uniform frequency characteristic and has no delay in the entire spectrum diffusion bandwidth.

The present invention has been made in view of such circumstances and an object of the present invention is to provide a distance measuring apparatus and a distance measuring method having a long measurement span and a high resolution and capable of implementing precise measurement.

A first means for addressing the above problems is a distance measuring apparatus including: means for generating a first pseudo random signal whose clock frequency is $f_1$; means for generating a second pseudo random signal having the same pattern as that of the first pseudo random signal and a clock frequency $f_2$ slightly lower than the clock frequency $f_1$; a first multiplier multiplying the first pseudo random signal and the second pseudo random signal together; means for generating a carrier wave of a microwave; means for phase modulating the carrier wave by the first pseudo random signal; means for transmitting the phase modulated carrier wave as an electromagnetic wave to a target; means for receiving the electromagnetic wave reflected from the target to obtain a received signal; a second multiplier multiplying the obtained received signal and the second pseudo random signal together; a hybrid coupler receiving part of the carrier wave to output an I signal and a Q signal as two components whose phases are orthogonal to each other; a third multiplier multiplying signal $R_1$ which is one of the two signals obtained by dividing the output signal of the second multiplier into two and the I signal together; a fourth multiplier multiplying the signal $R_2$ which is the other of the two signals obtained by dividing the output signal of the second multiplier into two and the Q signal together; a first low-pass filter subjecting the output signal of the first multiplier to the low-pass filtering process; a second low-pass filter subjecting the output signal of the third multiplier to the low-pass filtering process; a third low-pass filter subjecting the output signal of the fourth multiplier to the low-pass filtering process; first and second squaring devices squaring the output signals of the second and third low-pass filters individually; an adder adding the output signals of the first and second squaring devices; means for generating a first pulse when detecting the maximum amplitude value of the output signal of the first low-pass filter; means for generating a second pulse when detecting the maximum amplitude value of the output signal of the adder; means for measuring a time from the time at which the first pulse is generated and the time at which the second pulse is generated; a rough distance measuring portion in which ½ of the measured time and the propagation speed of the electromagnetic wave are multiplied together to obtain the product as a first computation value, a difference of frequency obtained by subtracting the clock frequency $f_2$ from the clock frequency $f_1$ is divided by the clock frequency $f_1$ to obtain the quotient as a second computation value, and the first computation value and the second computation value are multiplied together to obtain the product as a third computation value which is a distance to the target; a phase difference computing unit, in which, assuming that the output of the second low-pass filter is I' and the output of the third low-pass filter is Q', a phase difference $\theta = \tan^{-1}(Q'/I')$ is obtained; and a precise distance measuring portion, in which, assuming that the wavelength of the carrier wave is $\lambda$, a precise distance $= \theta \lambda / 2\pi$ is obtained.

A second means for addressing the above problems is a distance measuring method wherein when a distance measured by the rough distance measuring portion of the distance measuring apparatus as the first means is set as a rough initial value, a distance measured by the precise distance measuring portion is set as a precise initial value, and the sum of them is set as an initial value, a sum of the rough initial value and a difference between a distance measured by the precise distance measuring portion and the precise initial value is set as an output measurement value.

A third means for addressing the above problems is a distance measuring method wherein when a distance measured by the rough distance measuring portion of the distance measuring apparatus as the first means is set as a rough initial value, a distance measured by the precise distance measuring portion is set as a precise initial value, and the sum of them is set as an initial value, in a first measurement, a sum of the rough initial value and a difference between a distance measured by the precise distance measuring portion and the precise initial value is set as an output measurement value, and in a second measurement, a difference between an output currently obtained by the precise distance measuring portion and an output obtained in the preceding measurement by the precise distance measuring portion is taken and is added to the measurement value in the preceding measurement, to obtain a current measurement value.

A fourth means for addressing the above problems is a distance measuring method wherein in place of the distance measuring apparatus as the first means, a distance measuring apparatus using a phase difference computing unit, in which, assuming that the output of the second low-pass filter is I' and the output of the third low-pass filter is Q', a phase difference $\theta=\tan^{-1}(Q'/I')$ is obtained and, in place of the precise distance measuring portion in the first means, a precise distance measuring portion, in which, assuming that the wavelength of the carrier wave is $\lambda$, a precise distance=$(\theta\lambda+2n\pi)/2\pi$ (n is an integer) is used to obtain a plurality of precise distance measurement values, is used and when a distance measured by the rough distance measuring portion is set as a rough initial value, of sums of the rough initial value and the plurality of precise distance measurement values, the value closest to the current output of the rough distance measuring portion is set as a final measurement value.

A fifth means for addressing the above problems is a distance measuring method wherein when a value obtained by measuring a distance to a standard measuring plate in which a distance $L_0$ is previously found by the distance measuring method of any one of the second means to the fourth means is set as a standard initial value L' and then a value obtained by measuring a distance to the target by the distance measuring method used for the standard initial value is set as L, the value of $(L_0+L-L')$ is set as an output measurement value.

According to the present invention, there can be provided a distance measuring apparatus and a distance measuring method having a long measurement span and high resolution and capable of implementing precise measurement.

Figure 1:
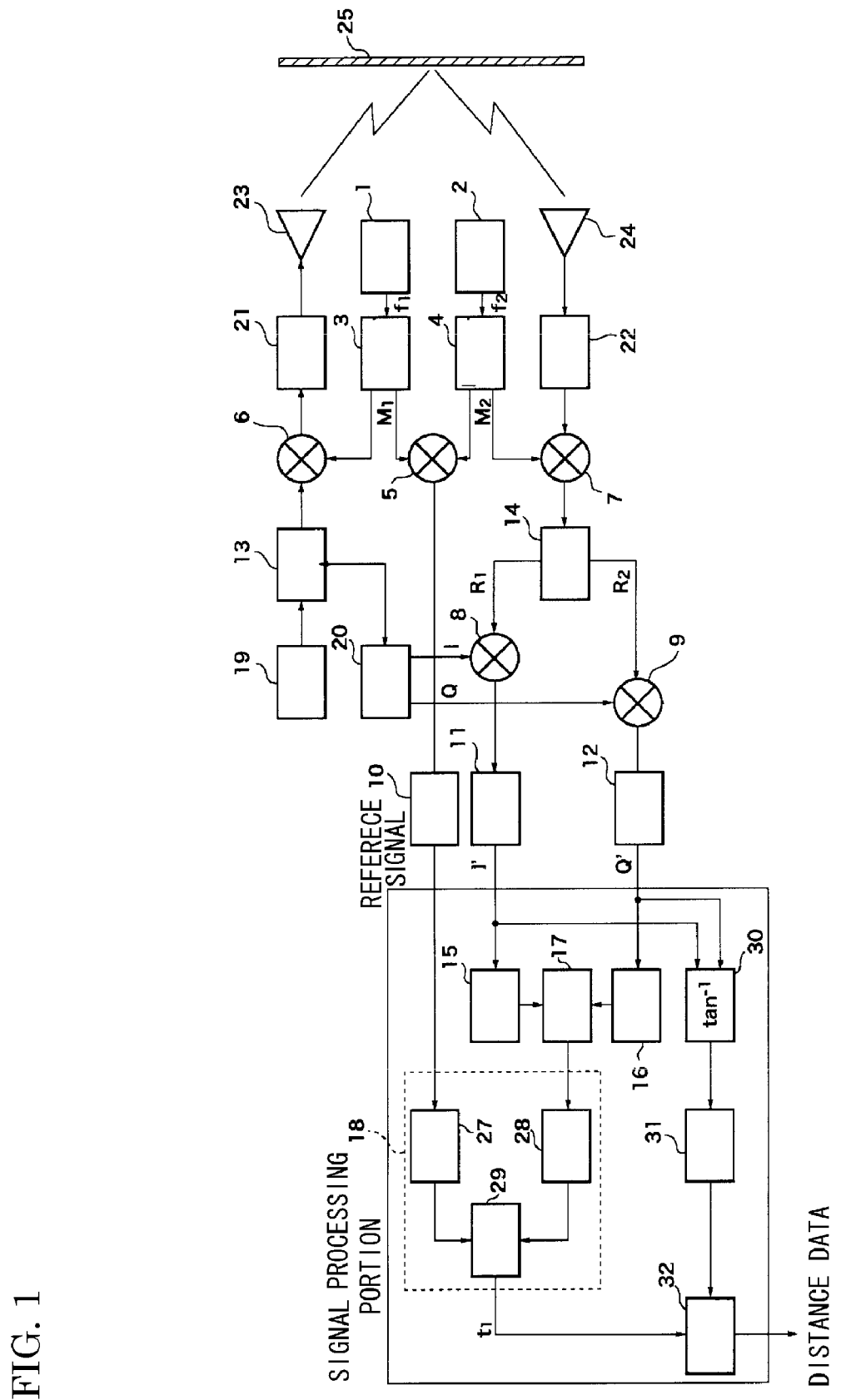
FIG. 1 is a schematic diagram showing a distance measuring apparatus according to one example of an embodiment of the present invention.

EXPLANATION OF THE REFERENCE NUMERALS 1, 2 . . . clock generator, 3, 4 . . . pseudo random signal (PN code) generator, 5 to 9 . . . multiplier (mixer), 10 to 12 . . . low-pass filter, 13, 14 . . . divider, 15, 16 . . . squaring device, 17 . . . adder, 18 . . . time measuring device, 19 . . . carrier wave oscillator, 20 . . . hybrid coupler, 21 . . . transmitter, 22 . . . receiver, 23 . . . transmitting antenna, 24 . . . receiving antenna, 25 . . . target, 27, 28 . . . maximum value detecting portion, 29 . . . time measuring portion, 30 . . . arc tangent computing unit, 31 . . . phase detector, 32 . . . distance computing means, 33 . . . shift register, 34 . . . exclusive OR circuit

BEST MODE FOR CARRYING OUT THE INVENTION

An example of an embodiment of the present invention will be described below with reference to the drawings. Before that, the principle of a rough distance measuring portion used for a distance measuring apparatus as one example of an embodiment of the present invention will be described.

The repetition frequency of a first pseudo random signal is $f_1$, the repetition frequency of a second pseudo random signal is $f_2$, and the patterns of the pseudo random signals are the same. Assume that $f_1 > f_2$.

Assuming that a period in which the reference signal obtained by correlating the first pseudo random signal to be transmitted and the second pseudo random signal reaches a maximum value is $T_B$, a difference between the wave number of the first pseudo random signal and that of the second pseudo random signal included in $T_B$ indicates a wave number N in one period.

That is;

$$T_B \cdot f_1 = T_B \cdot f_2 + N$$

From the equation described above, $T_B$ is given by Equation (1) described below.

$$T_B = N/(f_1 - f_2) \qquad (1)$$

As the difference between the two clock frequencies decreases, the period $T_B$ in which the reference signal reaches a maximum value increases.

The propagation time in which the carrier wave phase modulated by the first pseudo random signal is transmitted, reflected on the target, and then received is represented as $\tau$. The time difference between the time at which the pulse signal of the reference signal is generated and the time at which the pulse signal of the target detection signal is generated by demodulating the received signal by the second pseudo random signal for coherent detection, is represented as $T_D$. Then, since the wave number of the second pseudo random signal generated in $T_D$ is smaller than the wave number of the first pseudo random signal generated in $T_D$ by the wave number of the first pseudo random signal generated in time $\tau$, the following equation is established.

$$T_D \cdot f_2 = T_D \cdot f_1 - \tau \cdot f_1$$

From the equation described above, $T_D$ is given by Equation (2) described below.

$$T_D = \tau \cdot f_1/(f_1 - f_2) \qquad (2)$$

That is, the propagation time $\tau$ is measured as $T_D$ which is enlarged in time or is reduced in speed by the factor of $f_1/(f_1-f_2)$. Because of enlarged measured time, the present invention can provide a distance measuring apparatus essentially suitable for short-distance measurement.

Assuming that the propagation speed is v and the distance to the target is x, the propagation time is given by $\tau=2x/v$. Accordingly, Equation (3) described below is obtained from Equation (2).

$$x=(f_1-f_2) \cdot v \cdot T_D/(2f_1) \qquad (3)$$

Distance x can be measured using Equation (3) when the time difference $T_D$ is measured.

FIG. 1 is a schematic diagram showing a distance measuring apparatus according to one example of an embodiment of the present invention. In FIG. 1, clock generators are indicated by reference numerals 1 and 2, pseudo random signal (PN code) generators are indicated by reference numerals 3 and 4, and multipliers (mixers), e.g., double balanced mixers are indicated by reference numerals 5 to 9. Here, the multiplier 6 is used as phase modulation means of a carrier wave, the multipliers 5 and 7 are used as the processors in the first half of first and second correlation computing means, and the multipliers 8 and 9 are used as the processors in the first half of orthogonal detection means.

Low pass filters are indicated by reference numerals 10 to 12. The low-pass filter 10 is used as the integrating element necessary for the latter half of the first correlation computing means. The low-pass filters 11 and 12 are used as the integrating elements necessary for the latter half of the second correlation computing means. Thus, the first correlation computing means includes the multiplier 5 and the low-pass filter 10, and the second correlation computing means includes the multiplier 7 and the low-pass filters 11 and 12. Dividers are indicated by reference numerals 13 and 14, squaring devices are indicated by reference numerals 15 and 16, and an adder is indicated by reference numeral 17. The squaring devices 15 and 16 and the adder 17 are used as processors in the latter half of the orthogonal detection means. Thus, the orthogonal detection means includes the multipliers 8 and 9, the squaring devices 15 and 16, and the adder 17.

A time measuring device is indicated by reference numeral 18 and includes two maximum value detecting portions and a time measuring portion. The two maximum value detecting portions generate output pulses, respectively, when detecting the maximum amplitude values of input signals. The time measuring portion measures the time between the two output pulses. A carrier wave oscillator is indicated by reference numeral 19, a hybrid coupler is indicated by reference numeral 20, a transmitter is indicated by reference numeral 21, a receiver is indicated by reference numeral 22, a transmitting antenna is indicated by reference numeral 23, a receiving antenna is indicated by reference numeral 24, a target is indicated by reference numeral 25, and distance computing means (rough distance computing means) which includes a microprocessor or the like is indicated by reference numeral 26.

Figure 2:
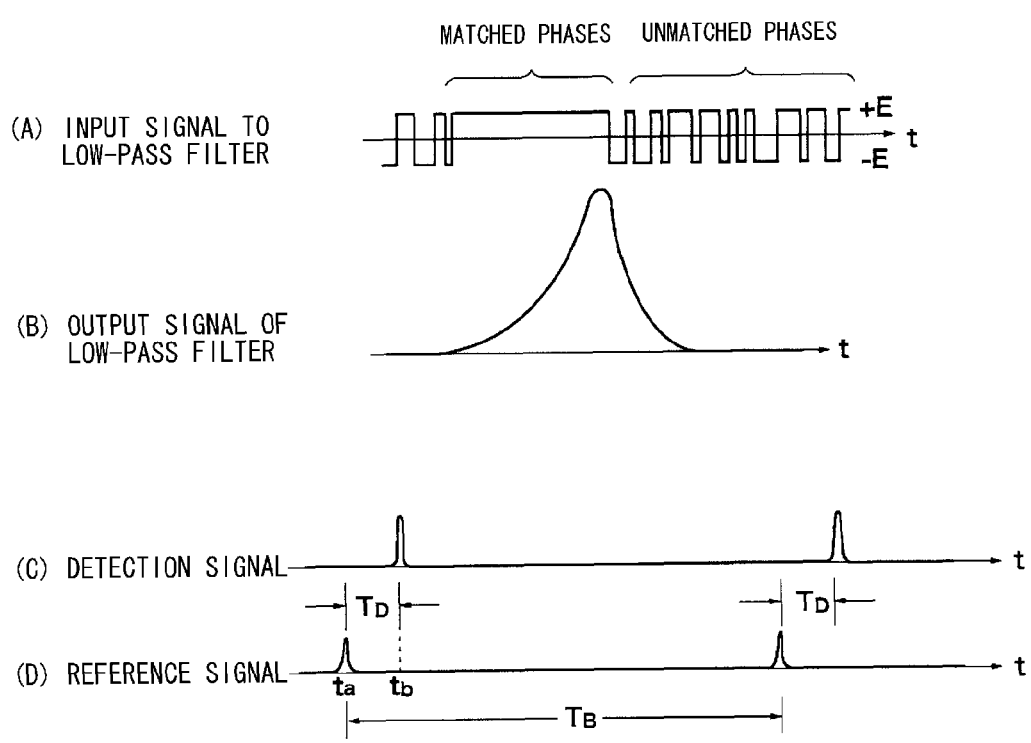
FIG. 2 is a diagram showing waveforms of signals and used for explanation of operation of the apparatus shown in FIG. 1.
Figure 3:
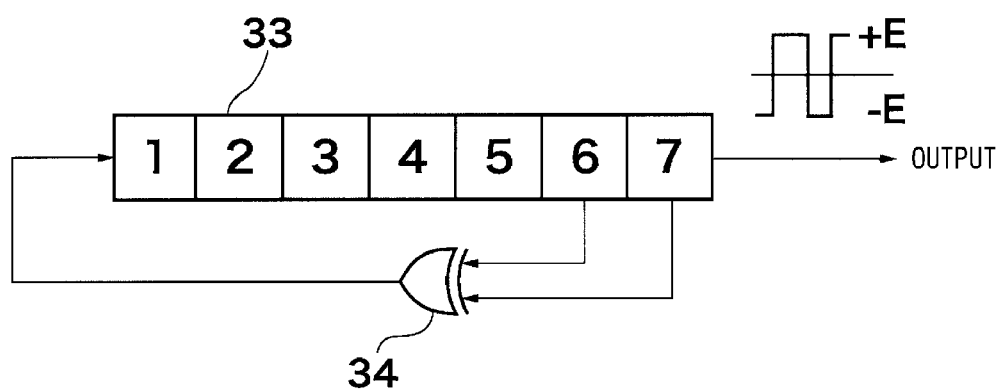
FIG. 3 is a block diagram of a 7-bit M-sequence signal generator.

FIG. 2 is a diagram showing waveforms of signals and used for explanation of operation of the apparatus shown in FIG. 1. FIG. 3 is a block diagram of a 7-bit M-sequence signal generator. A 7-stage shift register is indicated by reference numeral 33, and an exclusive OR circuit is indicated by reference numeral 34.

Operation of the apparatus shown in FIG. 1 will be described with reference to FIGS. 2 and 3. As the pseudo random signal generators 3 and 4, for example, M-sequence signal generators can be used. FIG. 3 shows the configuration of the 7-bit M-sequence signal generator, which includes the 7-stage shift register 33 with ECL (Emitter Couple Logic) elements and the exclusive OR circuit 34. An M-sequence signal is a periodic circulation signal of a combination of codes "1" (to which +E of a positive voltage corresponds) and "0" (to which −E of a negative voltage corresponds). In the case of 7 bits of this example, $2^7-1=127$ signals (also called 127 chips) are generated to complete one period and a circulation signal in which the period including 127 signals are repeated is generated.

The pseudo random signal generators 3 and 4 have circuits of the same structure. Therefore, the output signals of both are those having a precisely identical pattern. The frequencies are $f_1$ and $f_2$, respectively. The clock frequencies fed to the generators are slightly different from each other so that periods of the generators are slightly different from each other. As the pseudo random signal, a gold sequence signal and a JPL sequence signal can also be used, other than the M-sequence signal.

The clock generators 1 and 2 incorporate a quartz-crystal oscillator to generate clock signals at sufficiently stabled frequencies. In the present invention, the frequency $f_2$ generated by the clock generator 2 is set so as to be slightly lower than the frequency $f_1$ generated by the clock generator 1 by about $1/1000$ to $1/10000$ of $f_1$.

In this embodiment, the frequency $f_1$ generated by the clock generator 1 is 100.004 MHz, the frequency $f_2$ generated by the clock generator 2 is 99.996 MHz, and the frequency difference $f_1-f_{2=8}$ kHz is about $1/12500$ of $f_1$. The clock signals $f_1$ and $f_2$ outputted from the clock generators 1 and 2 are fed to the pseudo random signal generators 3 and 4, respectively. The pseudo random signal generators 3 and 4 output M-sequence signals $M_1$ and $M_2$ having the identical pattern although one period of $M_1$ and one period of $M_2$ are slightly different due to the frequency difference between the clock signals used for driving.

The periods of the two M-sequence signals $M_1$ and $M_2$ are obtained as below. The period of $M_1=127\times1/100.004$ MHz$\approx$1269.9492 ns and the period of $M_2=127\times1/99.996$ MHz$\approx$1270.0508 ns. The two M-sequence signals $M_1$ and $M_2$ have the period of about 1270 ns ($10^{-9}$ seconds). There is a time difference of about 0.1 ns between the periods of both. When the two M-sequence signals $M_1$ and $M_2$ are circulatively generated and the patterns of the two M-sequence signals are matched at the time $t_a$, the difference of 0.1 ns is generated between both the signals each time the time of one period elapses and a difference of 10 ns is generated between both the signals after 100 periods.

Here, the M-sequence signal contains 127 signals in one period of 1270 ns so that a time for one signal is 10 ns. Accordingly, a difference of 10 ns between the two M-sequence signals $M_1$ and $M_2$ means a shift between them by one signal period. The output $M_1$ of the pseudo random signal generator 3 is fed to the multipliers 5 and 6. The output $M_2$ of the pseudo random signal generator 4 is fed to the multipliers 5 and 7.

The carrier wave oscillator 19 delivers a microwave at a frequency of about 10 GHz. The output signal is divided by the divider 13 and is fed to the multiplier 6 and the hybrid coupler 20. The multiplier 6 including a double balanced mixer, for example, multiplies together the carrier wave at a frequency of about 10 GHz inputted by the divider 13 and the M-sequence signal $M_1$ inputted by the pseudo random signal generator 3. The multiplier 6 outputs a spectrum diffusion signal obtained by phase modulating the carrier wave, and feeds it to the transmitter 21. The transmitter 21 power amplifies the inputted spectrum diffusion signal, converts the signal to an electromagnetic wave via the transmitting antenna 23, and radiates the electromagnetic wave toward the target 25. Here, the wavelength of the electromagnetic wave at a frequency of 10 GHz in the air is 3 cm, which is sufficiently larger than the size (diameter) of dust particles in a furnace for steelmaking. Thus, the electromagnetic wave is hardly affected by the dust particles. By way of example, a horn antenna is used as the transmitting antenna 23 and the receiving antenna 24 so as to sharply narrowing directionality, thereby minimizing power of reflected waves from objects other than the target. By way of example, the antenna gain is about 20 dB. The electromagnetic wave radiated from the transmitting antenna 23 to the target 25 is reflected by the target 25 and is converted to an electric signal via the receiving antenna 24. The electric signal is inputted to the receiver 22. The timing at which the input signal is fed to the receiver 22 is delayed by the propagation time in which the electromagnetic wave radiated from the transmitting antenna 23, travels to the target 25, and reaches the receiving antenna 24. The receiver 22 amplifies the input signal and feeds it to the multiplier 7.

The M-sequence signals $M_1$ and $M_2$ inputted from the pseudo random signal generators 3 and 4 to the multiplier 5 as the processor in the first half of the first correlation computing means are multiplied together. The time series signal of the multiplier is fed to the low-pass filter 10 as the processor in the latter half of the first correlation computing means. FIG. 2(a) shows a waveform showing the input signal to the low-pass filter 10, that is, the time series signal as the output value of the multiplier 5. When the phases of the two pseudo random signals inputted to the multiplier 5 are matched, the output voltage of +E is continued. On the other hand, when the phases of both the signals are not matched, the output voltages of +E and −E are randomly generated.

The low-pass filters 10 to 12 perform frequency bandwidth limitation to perform an integrating process in the latter half of the correlation computing process. Specifically, each of the low-pass filters 10 to 12 performs integration of the value obtained by sequentially multiplying the two time series signals together, and outputs a triangular signal as shown in FIG. 2(b) when the phases of both the signals are matched. The output is zero when the phases of both the signals are not matched. Accordingly, the triangular signal occurs periodically in the output of the low-pass filter 10. The pulse signal is fed as the reference signal of time to the time measuring device 18. The period $T_B$ of the reference signal is computed by Equation (1). In this example, since the pseudo random signals are the 7-bit M-sequence signals $M_1$ and $M_2$, and the wave number N of one period is $2^7-1=127$, $f_1=100.004$ MHz, and $f_2=99.996$ MHz, $T_B=15.875$ ms is obtained. The reference signal and the period $T_B$ are shown in FIG. 2(d).

The signal received from the receiver 22 and the M-sequence signal $M_2$ from the pseudo random signal generator 4 are inputted to the multiplier 7 as the processor in the first half of the second correlation computing means to perform the multiplication of both the signals. As the output of the multiplier 7, when the modulated phase of the received signal in which the carrier wave for transmission is phase modulated by the first M-sequence signal $M_1$ and the phase of the second M-sequence signal $M_2$ are matched, the carrier wave signal of matched phase is outputted, and when the modulated phase of the received signal and the phase of the M-sequence signal $M_2$ are different, the carrier wave of random phase is outputted. Then, the output is fed to the divider 14. The divider 14 divides the input signal into two and feeds the divided outputs $R_1$ and $R_2$ to the multipliers 8 and 9 as the processors in the first half of the orthogonal detection means, respectively. The hybrid coupler 20 to which part of the carrier wave for transmission is fed from the divider 13 outputs a signal I having a component in phase with the input signal (a phase of)0° and a signal Q having a component orthogonal to the input signal (a phase of)90° and feeds them to the multipliers 8 and 9, respectively. The multiplier 8 performs the multiplication of the signal I (that is, the signal in phase with the output of the carrier wave oscillator 19) inputted from the hybrid coupler 20 and the signal $R_1$ inputted from the divider 14. Likewise, the multiplier 9 performs the multiplication of the signal Q (that is, the signal whose phase is different from that of the output of the carrier wave oscillator 19 by a phase of 90°) inputted from the hybrid coupler 20 and the signal $R_2$. The multipliers 8 and 9 extract the component having a phase of 0° (I·$R_1$) and the component having a phase of 90° (Q·$R_2$) in the received signals and feed the extracted signals I·$R_1$ and Q·$R_2$ as the signals processed in the first half of the orthogonal detection means to the low-pass filters 11 and 12, respectively.

The low-pass filters 11 and 12 have an integrating process function in the second half of the second correlation computing means and subject the signals I·$R_1$ and Q·$R_2$ to low-pass filtering process to perform integrating operation.

Here, the signals $R_1$ and $R_2$ inputted to the multipliers 8 and 9 via the divider 14 are the signals processed by the multiplier 7 in the first half of the correlation computing means, that is, the signals in which a coherence between the received carrier wave and the second pseudo random signal is detected. To detect a coherence between the signals $R_1$ and $R_2$ and the reference carrier wave, the multiplier 8 performs multiplication of the signal $R_1$ and the signal I having a component in phase with the reference carrier wave, and the multiplier 9 performs multiplication of the signal $R_2$ and the signal Q having a component orthogonal to the reference carrier wave.

The output waveforms of the multipliers 8 and 9 and the output waveforms of the low-pass filters 11 and 12 will be described below. When the phase of the signal $R_1$ inputted from the output of the multiplier 7 via the divider 14 to the multiplier 8 and the phase of the signal I inputted from the hybrid coupler 20 to the multiplier 8 are matched and when the phase of the signal $R_2$ inputted to the multiplier 9 and the phase of the signal Q are matched, the output signals of the multipliers 8 and 9 become the pulse signals (the pulse signals at a voltage of +E) having constant polarity, respectively. Thus, as outputs of the low-pass filters 11 and 12 integrating the signals, large positive voltages are obtained.

When the phases of the signal $R_1$ and the signal I are not matched and when the phase of the signal $R_2$ and the phase of the signal Q are not matched, the output signals of the multipliers 8 and 9 become the pulse signals having positive and negative polarities which randomly change (that is, the pulse signals at a voltage of +E or −E). Thus, as outputs of the low-pass filters 11 and 12 integrating the signals, zero is obtained. The signal having a component with a phase of 0° and the signal having a component with a phase of 90°, are subjected to the integrating process by the low-pass filters 11 and 12 and then fed to the squaring devices 15 and 16 which are the first computing units in the latter half of the orthogonal detection means. The squaring devices 15 and 16 square the amplitudes of the input signals and feed the output signals of the computed results to the adder 17. The adder 17 adds both the input signals together, outputs the pulse detection signal as shown in FIG. 2(c), and feeds it to the time measuring device 18. Assume the time at which the maximum value of the detection signal is generated is $t_b$.

The configuration of the system in which the multiplier 7 and the low-pass filters 11 and 12 as the correlation computing means and the multipliers 8 and 9, the squaring devices 15 and 16, and the adder 17 as the orthogonal detection means are mixed is somewhat complicated. However, the system provides the target detection signal at high sensitivity. In addition, the correlation outputs of the pseudo random signals such as the M-sequence signals are used to reduce a influence of noise and to enhance the signals. As a result, a measuring system having a high signal-to-noise ratio (S/N) can be realized. Needless to say, as the carrier wave detection system, there is a detection system using crystal. Although the sensitivity is lowered, the configuration can be simplified. This system can also be adopted in consideration of the specifications and cost.

The two maximum value detecting portions 27 and 28 are incorporated in the time measuring device 18. The former generates a first pulse at the time $t_a$ at which the maximum amplitude value of the reference signal inputted from the low-pass filter 10 is detected while the latter generates a second pulse at the time $t_b$ at which the maximum amplitude value of the detection signal inputted from the adder 17 is detected. The time measuring portion in the time measuring device 18 measures a time $T_D$ between time $t_a$ at which the first pulse is generated and time $t_b$ at which the second pulse is generated.

Each of the maximum value detecting portions 27 and 28 sequentially sample holds input voltage values according to the clock signals, and sequentially compares a sample value according to the current clock signal and that according to the preceding clock signal by a voltage comparing device. Then, it detects the time at which the state in which the input signal increases with respect to time changes to the state in which the input signal decreases with respect to time, so that it can detect the time at which the maximum value of the input signal occurs. Time $T_D$ is shown as the time period between time $t_a$ shown in FIG. 2(d) at which the maximum value of the reference signal appears and time $t_b$ shown in FIG. 2(c) at which the maximum value of the detection signal appears. As seen by Equation (2), time $T_D$ is obtained by enlarging, by the factor of $f_1/(f_1-f_2)$, the propagation time $\tau$ in which the electromagnetic wave transmitted from the transmitting antenna 23 actually travels to the target 25, and reaches the receiving antenna 24. In this example, $f_1$=100.004 MHz and $f_2$=99.996 MHz, and therefore the time is enlarged by the factor of 12,500. Thus, Equation (4) is obtained.

$$T_D = 12,500 \cdot \tau \quad (4)$$

Time $T_D$ of Equation (4) can be obtained for each period $T_B$ of the reference signal.

Time $T_D$ measured by the time measuring device 18 is fed to the distance computing means 32. The distance computing means 32 formed by a microprocessor or the like, performs computation using Equation (3) to obtain the distance x to the target.

That is, ½ of the measured time $T_D$ is multiplied by the propagation speed v of the electromagnetic wave to obtain the product $T_D \cdot v/2$, which is a first computation value. The frequency difference obtained by subtracting the clock frequency $f_2$ from the clock frequency $f_1$ is divided by the clock frequency $f_1$ to obtain the quotient $(f_1-f_2)/f_1$, which is a second computation value. Then, the first computation value and the second computation value are multiplied together to obtain the product, which is a third computation value as the distance x (roughly measured distance) to the target.

When the measured time $T_D$ is 254 μs, the distance x can be calculated by the distance computing means 32 as 3 meters. When $T_D$ is 2540 μs, the distance x can be calculated by the distance computing means 32 as 30 meters.

In the present invention, the measured time is enlarged very significantly, and therefore a distance to the target can be measured with high precision even if the distance is short.

The outline of the principle of the rough distance measurement of the present invention has been described above and most parts of it are cited from Patent Document 1. The uncited parts are also described in Patent Document 1 and are known. So, further description is omitted.

The measurement range of the rough distance measuring apparatus is long, but the precision is limited to about ±5 mm due to the reasons described above. To address this problem, in this embodiment, a precise distance measuring portion is provided.

That is, assuming that the frequency of the carrier wave is $f_0$, the speed is v, and the distance to the position of the target 25 is x, the phase $\theta$ of the vector of the microwave is below.

$$\theta = x \cdot f_0 / v\pi \quad (5)$$

Accordingly, when $\theta$ is measured, x can be measured.

The measurement of $\theta$ is performed as follows. The output of the low-pass filter 11 is a signal in phase with the signal I in phase with the carrier wave. The output of the low-pass filter 12 is a signal in phase with the signal Q having a component orthogonal to the carrier wave.

The output of the low-pass filter 11 is monitored, and the maximum signal during the time of $f_1/\{(f_1-f_2) \cdot f_0\}$ is represented as I'. Likewise, the output of the low-pass filter 12 is monitored during the same time period, and the maximum signal is represented as Q'. The phase $\theta$ of the reflected wave is obtained by $\theta=\tan^{-1}(Q'/I')$. Signals of 0 to 180° alone can be obtained by simple calculation of the arc tangent of Q'/I'. However, it is well known that signals of 0 to 360° can be obtained in consideration of signs of Q' and I'. The calculation of $\tan^{-1}(Q'/I')$ is performed in the arc tangent computing device 30 shown in FIG. 1. The calculation of the phase $\theta$ is performed by the phase detector 31 in consideration of signs of Q' and I'. Such computation of $\theta=\tan^{-1}(Q'/I')$ can be performed by the microprocessor.

Distance x calculated as described above is a relative one, not an absolute distance. Therefore, when the position of the target 25 is changed, new $\theta$ is obtained to obtain $\Delta\theta$, which is substituted into $$\Delta\theta = \Delta x \cdot f_0 / v\pi \quad (6)$$

Thus, the position change of the target 25 can be found. How to assign a sign to $\Delta\theta$ in Equation (6) will be described in detail later.

This method in which the angle of one carrier vector is measured has the advantage that it is hard to be affected by the followings.

(a) The low-pass filter performing bandwidth limitation makes the waveform obtuse due that the peak of the correlation waveform is not acute.

(b) The frequency is dispersed in a wide bandwidth due to spectrum diffusion. As a result, the waveform is affected by frequency characteristics and group delay frequency characteristics of components used and thus the waveform is distorted.

However, this method has the disadvantage that the measurement span is limited to the wavelength of the carrier wave. This is the reason why it is combined with the rough distance measuring device when used. This calculation is performed by the distance computing means 32.

The following measuring methods can be employed, by way of example.

A first method is as follows.

(1) The distance to the target 25 is determined by the rough distance measuring device by the method described above. At the same time, $\theta$ is measured by the precise distance measuring device. Assume that the distance measured by the rough distance measuring device or the sum of the distance measured by the rough distance measuring device and the relative distance $\theta_0$ measured by the precise distance measuring device is set as the reference distance. $\theta$ measured at this time may be set to 0° as the reference angle and when measuring an angle the difference between the angle and the reference angle may be set to $\theta$. In this case, the reference distance is the value measured by the rough distance measuring device. Such method corresponds to the invention claimed in claim 2 in which the precise initial value is set to 0 and therefore such method is included in the scope of the present invention.

(2) Thereafter, $\theta$ alone is measured to determine $\Delta\theta$ by $(\theta-\theta_0)$. Then, $\Delta x$ is determined by Equation (6), and is added to the reference distance to obtain the distance to the target 25.

Thus, measurement of $\theta$ can be performed in the range of ±180° with reference to $\theta_0$. After all, the same measuring range as the wavelength of the carrier wave can be obtained. In place of determining $(\theta-\theta_0)$ and then $\Delta x$, Equation (5) may be used to determine $x_0$ from $\theta_0$ and x from $\theta$ and $\Delta x$ may be obtained from the difference. This is equivalent to the method described above.

A second method is as follows.

(1) The determination of the reference distance is the same as the first method and the first measurement is also the same as the first method.

(2) In the second and succeeding measurements, a difference between $\theta_n$ as $\theta$ currently measured and $\theta_{n-1}$ measured in the preceding measurement is taken. The difference as $\Delta\theta$ is substituted into Equation (6) to determine a distance difference between the current value and the preceding value. The difference is added to the preceding measurement value to determine the current measurement value.

In place of determining a distance difference from the difference between $\theta_n$ and $\theta_{n-1}$, the precise distance $x_n$ may be determined from $\theta_n$, the precise distance $x_{n-1}$ may be determined from $\theta_{n-1}$, and the distance difference between the current value and the preceding value may be determined from the difference between $x_n$ and $x_{n-1}$. This is equivalent to the method described above. According to this method, the measuring range is not limited to the wavelength of the carrier wave.

However, when $\Delta\theta$ is detected, it may not be found whether the detected value of $\Delta\theta$ is obtained after the angle increases by $\Delta\theta$ or it is obtained after the angle decreases by $(2\pi-\Delta\theta)$ beyond $-180°$ corresponding to $+180°$. To avoid this, only a distance in which the change of $\theta$ does not exceed $180°$ in the sampling interval is measured. Then, when the observed $\Delta\theta$ is $\theta \leq 180°$, the target 25 is determined to have moved in the direction in which it becomes closer to the antenna, and when the observed $\Delta\theta$ is $\theta \geq 180°$, the target 25 is determined to have moved in the direction in which it goes away from the antenna. Thus, the sign of $\Delta X$ in Equation (6) should be calculated.

When the difference between en and $\theta_n$ is obtained, for example, $\theta_{n-1}$ is $+170°$ and $\theta_n$ increases by $20°$. Then, $\theta_n$ exceeds $+180°$ and is determined to be $\theta_n=-170°$. To avoid such inconvenience, even if $\theta_{n-1}$ is $+170°$, it is read as $0°$ so that the value of $\theta_n$ should be determined with reference to it. Thus, the value of $(\theta_n-\theta_{n-1})$ is correctly calculated as $20°$. In other words, when the difference between $\theta_n$ and $\theta_{n-1}$ is determined, the value of $\theta_{n-1}$ is set to zero, that is, $\theta_{n-1}=0°$ and the value of $\theta_n$ is determined with respect to $\theta_{n-1}$ as the reference.

A third method is as follows.

(1) The reference distance is determined by the same method as (1) of the first method.

(2) $\theta = x \cdot f_0 / w\pi \pm 2n\pi$ (n is an integer) is substituted into Equation (5) to determine a plurality of distances in the precise distance measuring device.

(3) The output of the rough distance measuring device when the reference distance is determined and the plurality of distances determined in (2) are added together to determine a plurality of distances.

(4) Of the plurality of distances determined in (3), the distance closest to the value of the rough distance measuring device is adopted as the distance to be obtained.

According to the method, even when the phase of the reflected wave is rotated by $360°$ or more during the measurement interval, the distance to the target 25 can be determined. Further, advantageously, the measuring range is not limited to the wavelength range of the carrier wave.

According to the methods described above, an absolute value cannot be obtained because a value measured by the rough distance measuring device is a relative one, not an absolute one. To cope with this, a distance to a standard measuring plate in which the distance $L_0$ is previously found is measured by the distance measuring method of the embodiment of the present invention, and the value of the measured distance is set as the standard initial value L'. Then, assuming that a value of the distance measured by the same distance measuring method is L, the value of $(L_0+L-L')$ should be an output measurement value.

What is claimed is:

1. A distance measuring apparatus comprising:
   means for generating a first pseudo random signal whose clock frequency is $f_1$;
   means for generating a second pseudo random signal having the same pattern as that of the first pseudo random signal and a clock frequency $f_2$ slightly lower than the clock frequency $f_1$;
   a first multiplier multiplying the first pseudo random signal and the second pseudo random signal together;
   means for generating a carrier wave of a microwave;
   means for phase modulating the carrier wave by the first pseudo random signal;
   means for transmitting the phase modulated carrier wave as an electromagnetic wave to a target;
   means for receiving the electromagnetic wave reflected from the target to obtain a received signal;
   a second multiplier multiplying the obtained received signal and the second pseudo random signal together;
   a hybrid coupler receiving part of the carrier wave to output an I signal and a Q signal as two components whose phases are orthogonal to each other;
   a third multiplier multiplying signal $R_1$ which is one of the two signals obtained by dividing the output signal of the second multiplier into two and the I signal together;
   a fourth multiplier multiplying the signal $R_2$ which is the other of the two signals obtained by dividing the output signal of the second multiplier into two and the Q signal together;
   a first low-pass filter subjecting the output signal of the first multiplier to the low-pass filtering process;
   a second low-pass filter subjecting the output signal of the third multiplier to the low-pass filtering process;
   a third low-pass filter subjecting the output signal of the fourth multiplier to the low-pass filtering process;
   first and second squaring devices squaring the output signals of the second and third low-pass filters individually;
   an adder adding the output signals of the first and second squaring devices;
   means for generating a first pulse when detecting the maximum amplitude value of the output signal of the first low-pass filter;
   means for generating a second pulse when detecting the maximum amplitude value of the output signal of the adder;
   means for measuring a time from the time at which the first pulse is generated and the time at which the second pulse is generated;
   a rough distance measuring portion in which ½ of the measured time and the propagation speed of the electromagnetic wave are multiplied together to obtain the product as a first computation value, a difference of frequency obtained by subtracting the clock frequency $f_2$ from the clock frequency $f_1$ is divided by the clock frequency $f_1$ to obtain the quotient as a second computation value, and the first computation value and the second computation value are multiplied together to obtain the product as a third computation value which is a distance to the target;
   a phase difference computing unit, in which, assuming that the output of the second low-pass filter is I' and the output of the third low-pass filter is Q', a phase difference $\theta = \tan^{-1}(Q'/I')$ is obtained; and a precise distance measuring portion, in which, assuming that the wavelength of the carrier wave is $\lambda$, a precise distance=$\theta\lambda/2\pi$ is obtained.

2. A distance measuring method wherein when a distance measured by the rough distance measuring portion of the distance measuring apparatus according to claim 1 is set as a rough initial value, a distance measured by the precise distance measuring portion is set as a precise initial value, and the sum of them is set as an initial value, a sum of the rough initial value and a difference between a distance measured by the precise distance measuring portion and the precise initial value is set as an output measurement value.

3. A distance measuring method wherein when a distance measured by the rough distance measuring portion of the distance measuring apparatus according to claim 1 is set as a rough initial value, a distance measured by the precise distance measuring portion is set as a precise initial value, and a sum of them is set as an initial value, in a first measurement, the sum of the rough initial value and a difference between a distance measured by the precise distance measuring portion and the precise initial value is set as an output measurement value, and in a second measurement, a difference between an output currently obtained by the precise distance measuring portion and an output obtained in the preceding measurement by the precise distance measuring portion is taken and is added to the measurement value in the preceding measurement, to obtain a current measurement value.

4. A distance measuring method wherein in place of the distance measuring apparatus according to claim 1, a distance measuring apparatus using a phase difference computing unit, in which, assuming that the output of the second low-pass filter is I' and the output of the third low-pass filter is Q', a phase difference $\theta=\tan^{-1}(Q'/I')$ is obtained and, in place of the precise distance measuring portion according to claim 1, a precise distance measuring portion, in which, assuming that the wavelength of the carrier wave is $\lambda$, a precise distance= $(\theta\lambda+2n\pi)/2\pi$ (n is an integer) is used to obtain a plurality of precise distance measurement values, is used and when a distance measured by the rough distance measuring portion is set as a rough initial value, of sums of the rough initial value and the plurality of precise distance measurement values, the value closest to the current output of the rough distance measuring portion is set as a final measurement value.

5. A distance measuring method wherein when a value obtained by measuring a distance to a standard measuring plate in which a distance $L_0$ is previously found by the distance measuring method according to claim 2 is set as a standard initial value L' and then a value obtained by measuring a distance to the target by the distance measuring method used for the standard initial value is set as L, the value of $(L_0+L-L')$ is set as an output measurement value.

6. A distance measuring method wherein when a value obtained by measuring a distance to a standard measuring plate in which a distance $L_0$ is previously found by the distance measuring method according to claim 3 is set as a standard initial value L' and then a value obtained by measuring a distance to the target by the distance measuring method used for the standard initial value is set as L, the value of $(L_0+L-L')$ is set as an output measurement value.

7. A distance measuring method wherein when a value obtained by measuring a distance to a standard measuring plate in which a distance $L_0$ is previously found by the distance measuring method according to claim 4 is set as a standard initial value L' and then a value obtained by measuring a distance to the target by the distance measuring method used for the standard initial value is set as L, the value of $(L_0+L-L')$ is set as an output measurement value.

\* \* \* \* \*